United States Patent [19]

Rutkowski et al.

[11] Patent Number: 4,807,136
[45] Date of Patent: Feb. 21, 1989

[54] DRAFT LOAD MEASUREMENT AND CONTROL

[75] Inventors: David J. Rutkowski; Douglas H. McLean, both of Grosse Ile, Mich.

[73] Assignee: Ford Motor Company, Dearborn, Mich.

[21] Appl. No.: 112,788

[22] Filed: Oct. 26, 1987

[51] Int. Cl.⁴ .................. G06F 15/20; A01B 63/112
[52] U.S. Cl. .................. 364/424.07; 172/7; 340/684; 364/508; 364/556; 364/551.01
[58] Field of Search ............. 364/424, 550, 551, 558, 364/556, 508; 172/3, 7, 9, 10; 344/684

[56] References Cited

U.S. PATENT DOCUMENTS

| | | | |
|---|---|---|---|
| 3,834,481 | 9/1974 | Carlson | 172/7 |
| 4,077,475 | 3/1978 | Hino et al. | 172/7 |
| 4,300,638 | 11/1981 | Katayama et al. | 172/7 |
| 4,343,365 | 8/1982 | Rajogopal et al. | 172/7 |
| 4,385,353 | 5/1983 | Schneider | 364/424 |
| 4,437,048 | 3/1984 | Arnold | 364/424 |
| 4,495,577 | 1/1985 | Strunk et al. | 364/424 |
| 4,503,916 | 3/1985 | Wiegardt | 172/3 |
| 4,518,044 | 5/1985 | Wiegardt et al. | 364/424 |
| 4,658,908 | 4/1987 | Hannukainen | 172/10 |
| 4,715,012 | 12/1987 | Mueller, Jr. | 364/424 |

*Primary Examiner*—Felix D. Gruber
*Assistant Examiner*—Kevin J. Teska
*Attorney, Agent, or Firm*—Allan J. Lippa; Peter Abolins

[57] ABSTRACT

A tractor coupled to a draft implement through at least one link arm of a hydraulic lift assembly having a lift rod coupled between each link arm and a hydraulic cylinder for raising and lowering the draft implement. A force sensor is coupled to a link arm for providing a measurement of the total force exerted on the link arm. Electrical circuitry provides a measurement of the actual draft force by correcting the total force measurement for lift forces transmitted to the link arm through the corresponding lift rod. A feedback or draft control system is also provided for adjusting the depth of the draft implement in inverse relation to the corrected measurement of actual draft force.

12 Claims, 2 Drawing Sheets

DRAFT LOAD MEASUREMENT AND CONTROL

BACKGROUND OF THE INVENTION

The present invention relates to a control system for accurately measuring the draft force exerted by a draft implement such as a plow or cultivator. In another aspect of the invention, the control system adjusts the depth of the draft implement in response to the measurement of draft load.

It is known to adjust the depth of a draft implement in inverse relation to a measurement of draft load. One of two reasons are typically given for this adjustment. One reason is that without depth adjustment, the vehicle engine may stall or incur damage when an excess draft load is encountered, such as when encountering heavy soil conditions during field plowing. Another reason is that without depth adjustment, the depth of the draft implement increases when the towing vehicle encounters an incline and, conversely, decreases when the towing vehicle encounters a decline. By adjusting the depth of the draft implement in inverse relation to an indication of draft load, a more uniform plowed field may be obtained.

Several approaches are known for providing an approximation of draft load. In one prior approach, draft load is inferred from a deviation in measured engine rpm from a single set value of engine rpm associated with maximum horsepower output. A disadvantage with this approach is that draft vehicles are usually operated near the peak horsepower of the engine wherein the torque versus rpm curve is relatively flat. Substantially large variations in engine rpm are therefore associated with relatively small variations in draft load. Accordingly, this system is prone to fluctuate or search around a desired depth associated with the set value of engine rpm. Thus, even without variations in soil density or variations in grade, the plowed field depth will fluctuate.

In another approach, as disclosed in U.S. Pat. No. 4,077,475, draft depth is varied in inverse relation to a combination of rpm deviation and actual implement depth. By adding feedback for actual implement depth, the effect of depth variation with variations in engine rpm is allegedly dampened. However, it appears that a system of this type is prone to oscillate. Further, the inventors herein have recognized that the degree of dampening is not adjustable to compensate for a change in the draft implement used or for changes in field soil conditions.

In another common approach, as disclosed in U.S. Pat. Nos. 3,834,481; 4,300,638; 4,343,365; 4,495,577; 4,518,044, a force transducer is coupled to a link arm of the tractor for providing an electrical signal which is related to the total force transmitted to the link arm. This signal is then used as a feedback variable in a feedback control system utilizing other feedback variables such as arm position, engine rpm, selected arm position, and hydraulic cylinder pressure. The inventors herein have recognized that a problem with providing a measurement of draft force from a force transducer coupled to a link arm is that the measurement of force includes more than just the draft force. For example, the force measurement will include a force component transmitted through a lift rod in raising the implement.

SUMMARY OF THE INVENTION

It is an object of the present invention to provide a measurement of draft force which is more accurate than heretofore possible.

The above and other problems are overcome, and object achieved, by providing an apparatus for measuring the draft force exerted by a draft implement coupled to a tractor through at least one link arm of a hydraulic lift assembly having at least one lift rod coupled between each link arm and a hydraulic cylinder for lifting or lowering the draft implement. More specifically, in one aspect of the invention, the apparatus comprises: a force transducer coupled to the link arm for providing a total force signal related to the total force applied against the link arm; a Pressure sensor coupled to the cylinder for providing a pressure signal related to cylinder Pressure; a position sensor coupled to the lift rod for Providing a lift position signal related to the position of the lift rod; processing means responsive to both the pressure signal and the lift position signal for providing a component lift force signal related to the component of lift force transmitted to the link arm through the lift rod; and means for adding the component lift force signal to the total force signal to provide a corrected draft force signal proportional to the draft force exerted by the implement. An advantage is thereby obtained of providing an accurate measurement of draft force without including other force components such as lift force components. With an accurate measurement of draft force available, a more accurate feedback control system is obtainable for adjusting the implement depth in inverse relation to the draft force signal.

In another aspect of the invention, a feedback control system is provided, comprising: a force transducer coupled to the link arm for providing a total force signal related to the total force applied against the link arm; a pressure sensor coupled to the cylinder for providing a pressure signal related to cylinder pressure; a position sensor coupled to the lift rod for providing a lift position signal related to the position of the lift rod; processing means responsive to both the pressure signal and the lift position signal for providing a component lift force signal related to the component of lift force transmitted to the link arm through the lift rod; means for adding the component lift force signal to the total force signal to provide a corrected draft force signal proportional to the draft force exerted by the implement; combining means for combining a preselected portion of the corrected draft force signal with a preselected portion of the lift position signal to form a feedback signal; and a hydraulic valve coupled to the cylinder and responsive to the feedback signal for changing the depth of the implement in response to the feedback signal. This control system is more accurate than heretofore possible because it responds to an accurate measurement of draft force and does not respond to other forces resulting from the implement weight. Further, by combining preselected portions of both draft force feedback and position feedback, the sensitivity of the control system may be adjusted. Another advantage is thereby obtained of enabling the operator to adjust for sensitivity when the draft implement is changed or the soil conditions vary.

DETAILED DESCRIPTION

Figure 1:
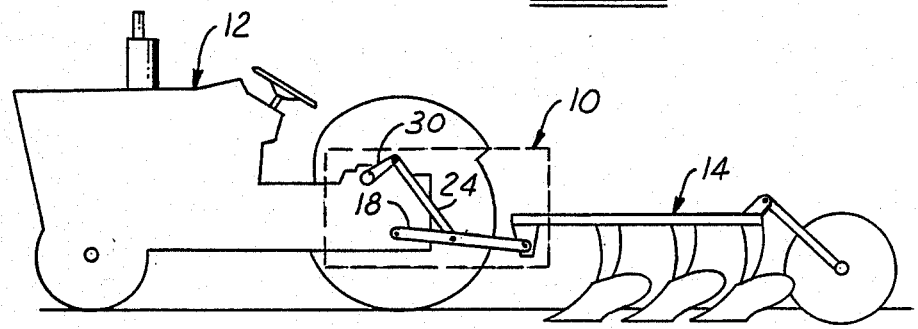
FIG. 1 shows a draft implement coupled to a tractor via a conventional hydraulic power lift system.

Referring to FIG. 1, hydraulic power lift system 10 of tractor 12 is shown coupled to draft implement 14, herein illustrated as a plow, by lift system 10 which is only one embodiment of a large family of lift systems.

Figure 2:
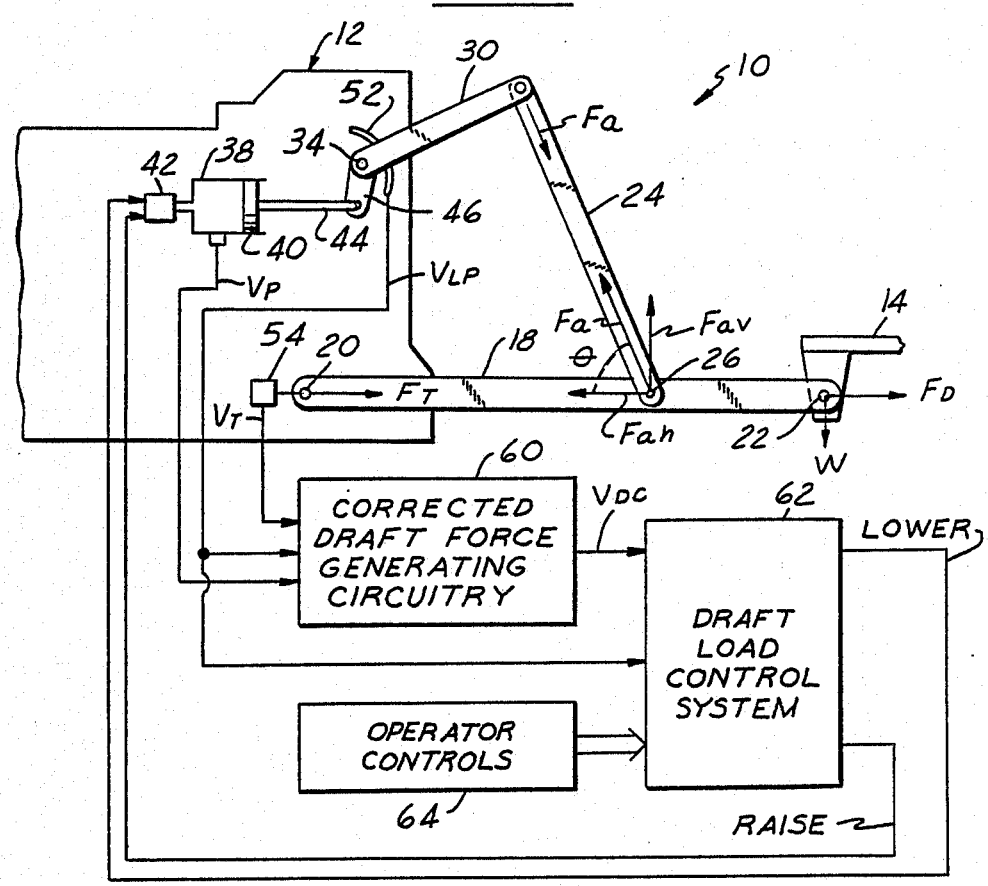
FIG. 2 is an expanded view of the hydraulic power lift system illustrated in FIG. 1 including a block diagram of associated electronic circuitry.

Referring now to FIG. 2, a left-side elevation view of lift system 10 is shown including link arm 18, having a length b, coupled to tractor 12 at pivot point 20 and also coupled to implement 14 at coupling 22. Link arm 18 is also shown coupled to lift rod 24 at pivot point 26 defining angle $\theta$ therebetween and also defining length a of link arm 18 between pivot points 20 and 26. Lift arm 30, having a length d, is shown coupled to an end of horizontal rock shaft 34. Lift rod 24 is coupled to horizontal rock shaft 34 such that movement of lift rod 44 results in movement of lift arm 30.

Hydraulic cylinder 38, having a piston 40 of cross-sectional area A and hydraulically actuated by a conventional hydraulic power lift valve (HPL) 42, is shown coupled to rocker shaft 34 via piston shaft 44 and connecting rod 46 having a length c. Electrical raise signal and electrical lower signal actuate HPL valve 42 thereby hydraulically actuating cylinder 38.

It is to be understood that there are symmetrically positioned right-hand components which are not shown in the left-side elevation view of lift assembly 10 in FIG. 2. More specifically, link arm 18', pivot point 20', pivot point 26', coupling 22', lift rod 24', and lift arm 30' are not shown. Lift arms 30 and 30' are connected together by horizontal rock shaft 34 which is coupled to the single connecting rod 46. Accordingly, lift rod 24, lift rod 24', link arm 18, and link arm 18' move about their respective pivot points in response to movement of rock shaft 34.

Pressure transducer 50 is coupled to cylinder 38 for generating pressure signal $V_P$ proportional to the pressure exerted by cylinder 38 for raising lift rod 24. Position sensor 52 is shown coupled to rocker shaft 34 for generating lift position signal $V_{LP}$ related to the lift position of lift rod 24 and, accordingly, the depth of implement 14.

Force transducer 54, preferably including a strain gauge coupled to pivot point 20 and associated electronic circuitry, generates total force signal $V_T$ proportional to the total force ($F_T$) exerted on link arm 18. For the particular embodiment of lift assembly 10 shown in FIG. 2, total force $F_T$ includes two force components. More specifically, $F_T$ is defined as the total draft force $F_D$ exerted on link arm 18 by draft implement 14 reduced by the horizontal lift force component $F_{ah}$ transmitted through lift rod 24 to link arm 18. Thus, to obtain an accurate measurement of draft force $F_D$ from force transducer 54, it is necessary to add the horizontal lift force component $F_{ah}$ to the measured force $F_T$.

The horizontal lift force component $F_{ah}$ is related to a portion of implement weight W acting on lift assembly 10 as follows. Referring to the force vectors shown in FIG. 2, it is seen that the vertical portion of implement weight (W) acting on link arm 18 at pivot point 26 is approximately equal to W times b/a. Accordingly, the vertical component ($F_{av}$) of lift force $F_a$ transmitted through lift rod 24 from cylinder 38 must approximately equal W b/a for the particular geometry of lift assembly 10. In generating vertical lift force $F_{av}$, however, a horizontal lift force component $F_{ah}$ is also generated. For the embodiment shown in FIG. 2, the horizontal lift force component $F_{ah}$ will cause an error in the draft force measurement unless a correction is provided.

This correction is provided by corrected draft force generating circuitry 60 which is described in greater detail later herein with particular reference to FIG. 3. In general terms, corrected draft force generating circuitry 60 computes horizontal lift component signal $V_{ah}$, related to $F_{ah}$, from pressure signal $V_P$ and lift position signal $V_{LP}$. Horizontal lift component signal $V_{ah}$ is then added to total force signal $V_T$ thereby generating corrected draft force signal $V_{DC}$. Accordingly, corrected draft force signal $V_{DC}$ represents a true measurement of draft force.

Continuing with FIG. 2, draft load control system 62 provides appropriate draft implement lower and raise signals in response to corrected draft force signal $V_{DC}$, lift position signal $V_{LP}$, and operator controls 64 as described later herein with particular reference to FIG. 4.

Figure 3:
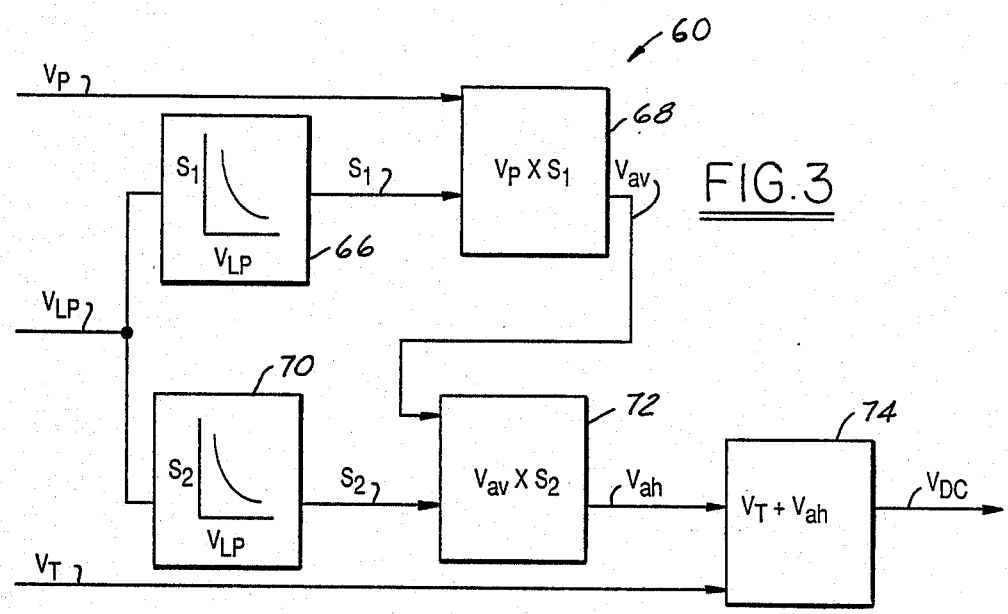
FIG. 3 shows a more detailed block diagram of a portion of the electronic circuitry shown in FIG. 2.

Referring now to FIG. 3, a detailed block diagram of corrected draft force generating circuitry 60 is shown. Scale factor memory 66 provides a scale factor $S_1$ at each lift position for converting the corresponding pressure signal $V_P$ at that lift position into a vertical lift force signal $V_{av}$ proportional to the vertical component of lift force $F_{av}$ transmitted through lift rod 24. Preferably, the scale factors in memory of scale factor memory 66 are derived from the pressure versus lift position curve at a constant implement weight for the particular geometry of lift assembly 10. With respect to the geometry of lift assembly 10 shown in FIG. 2, for example, scale factor $S_1$ is approximated as follows:

$$S_1 \approx \frac{CA \sin\theta}{d} \approx \frac{F_{av}}{P}$$

Angle $\theta$ can be related to lift position through an analysis of the geometry of the linkages.

Multiplier 68 then multiplies scale factor $S_1$ times pressure signal $V_P$ to generate vertical lift force signal $V_{av}$ at a particular lift position.

Scale factor memory 70 provides a scale factor $S_2$ at each lift position for converting the corresponding vertical lift force signal $V_{av}$ at that lift position into the corresponding horizontal lift force signal $V_{ah}$. The scale factors $S_2$ in scale factor memory 70 are derived from the geometry of lift assembly 10. For the particular geometry shown in FIG. 2, scale factors $S_2$ are approximated by the following equation:

$$S_2 \approx \cot\theta \approx \frac{F_{ah}}{F_{av}}$$

Multiplier 72 then multiplies scale factor $S_2$ times vertical force signal $V_{av}$ to generate horizontal lift force signal $V_{ah}$. Corrected draft force signal $V_{DC}$ is then generated in correction circuitry 74 by adding horizontal lift force signal $V_{ah}$ to total force signal $V_T$.

Figure 4:
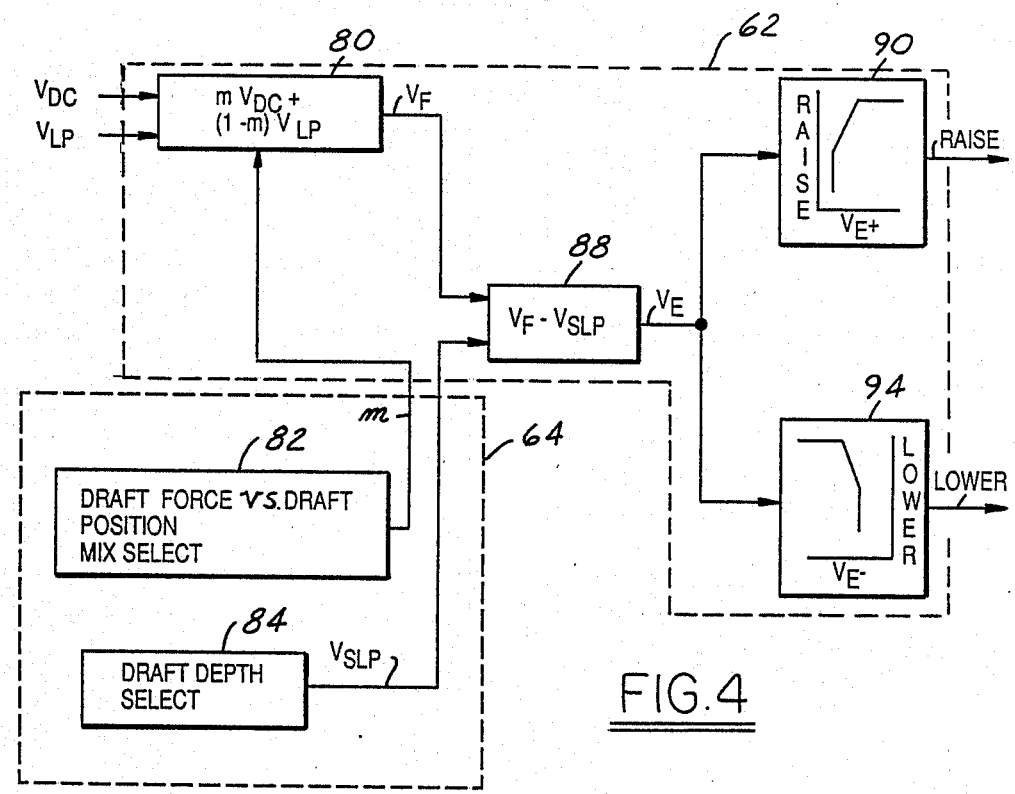
FIG. 4 shows a more detailed block diagram of Portion of the electronic circuitry shown in FIG. 2.

Referring now to FIG. 4, a detailed block diagram of draft load control system 62 is shown wherein corrected draft force signal $V_{DC}$ is used to advantage. In general terms, draft load control system 62 defines a feedback control system wherein implement depth is adjusted in inverse relation to corrected draft load signal $V_{DC}$ for maintaining a substantially constant draft load.

The sensitivity of draft load control system 62 is determined by operator controls 64. More specifically, feedback signal combiner 80 generates feedback signal $V_F$ by combining a preselected portion m of corrected draft load signal $V_{DC}$ with a complementary preselected portion (1 −m) of lift position signal $V_{LP}$. That is, $V_F = m\ V_{DC} + (m-1)V_{LP}$. The preselected portion m, which varies from zero to one, is determined by operator actuated draft force versus draft Position mix select 82 responsive to operator controls (not shown) on the tractor control panel (not shown).

When the operator selects maximum draft feedback sensitivity, preselected portion m is set equal to one. Feedback signal $V_F$ is then equivalent to corrected draft load signal $V_{DC}$, whereby draft load control system 62 is responsive only to corrected draft load signal $V_{DC}$. Conversely, when the operator desires that control system 62 be responsive only to the position setting, portion m is set at a zero value wherein feedback signal $V_F$ is equivalent to lift position signal $V_{LP}$.

As described in greater detail hereinafter, response to the Position only setting is utilized to electronically set the desired draft depth before plowing a row. By choosing intermediate values of m, the operator is able to select the desired feedback sensitivity for the particular soil conditions encountered.

Continuing with FIG. 4, draft depth select 84 generates a selected lift position signal $V_{SLP}$ in response to operator selection of a desired draft depth on the tractor control panel (not shown). Selected lift position signal $B_{SLP}$ is subtracted from feedback signal $V_F$ in error signal generator 88 to generate error signal $V_E$.

Raise command signal generator 90 and lower command signal generator 94 are each coupled to error signal $V_E$ for providing the appropriate raise and lower signals to hydraulic power lift valve 42 for operating hydraulic cylinder 38. The raise and lower signals are graphically illustrated as being linearly proportional to $V_E$ until a maximum (100%) signal strength is achieved. By varying this proportionality, additional dampening is introduced into draft load control system 62.

In a typical operation, before beginning a row, the operator will first select the desired draft depth by draft depth select 84, and also set portion m to a zero value via draft force versus draft position mix select 82. Error signal $V_E$ is then equal to the difference between lift position signal $V_{LP}$ and selected draft position signal $V_{SLP}$. In response, the draft depth is appropriately adjusted by raise command signal and lower command signal until the error signal $V_E$ is substantially zero.

After the desired depth of draft implement 14 is electronically set, the operator then sets portion m such that adjustment to the depth of draft implement by draft load control system 62 is also responsive to variations in draft load. During field plowing, the operator adjusts the sensitivity of the draft load control system, as desired, by appropriate setting of portion m via draft force versus draft position mix select 82.

Various modifications and variations will no doubt occur to those skilled in the various arts to which this invention pertains. For example, the draft load control system may be designed, by those having appropriate skills in the art, with either analog devices or digital devices. These and all other variations which basically rely on the teachings to which this disclosure has advanced the art are properly considered within the scope of this invention.

We claim:

1. An apparatus for providing a measurement of draft force exerted by a draft implement coupled to a tractor through at least one link arm of a hydraulic lift assembly having at least one lift rod coupled between each link arm and a hydraulic cylinder for lifting or lowering the draft implement, comprising:
   a force transducer coupled to the link arm for providing a total force signal related to the total force applied against the link arm;
   a pressure sensor coupled to the cylinder for providing a pressure signal related to cylinder pressure;
   position means coupled to the lift rod for providing a lift position signal related to the position of the lift rod;
   processing means responsive to both said pressure signal and said lift position signal for providing a component lift force signal related to the component of lift force transmitted to the link arm through the lift rod; and
   means for adding said component lift force signal to said total force signal to provide a corrected draft force signal proportional to the draft force exerted by the implement.

2. The apparatus recited in claim 1 wherein said processing means comprises:
   first means responsive to both said pressure signal and said lift position signal for providing a weight signal related to the weight of the implement; and
   second means responsive to said weight signal and said lift position signal for generating said component lift force signal.

3. The apparatus recited in claim 2 wherein said first means comprises:
   first scale factor means responsive to said lift position signal for providing a first scale factor to convert said pressure signal into said weight signal; and
   first conversion means responsive to both said first scale factor and said pressure signal for converting said pressure signal into said weight signal.

4. The apparatus recited in claim 2 wherein said second means comprises:
   second scale factor means responsive to said lift position signal for providing a second scale factor to convert said weight signal into said component lift force signal; and
   second conversion means responsive to said second scale factor and said weight signal for converting said weight signal into said component lift force signal.

5. The apparatus recited in claim 3 wherein said first scale factor means comprises a first memory of said first scale factors, said first memory being addressable by said lift position signal.

6. The apparatus recited in claim 3 wherein said first conversion means comprises a first multiplier for multiplying said first scale factor times said pressure signal.

7. The apparatus recited in claim 4 wherein said second scale factor means comprises a second memory of said second scale factors, said second memory being addressable by said lift position signal.

8. The apparatus recited in claim 4 wherein said second conversion means comprises a second multiplier for multiplying said second scale factor times said pressure signal.

9. An apparatus responsive to a measurement of draft force for adjusting the depth of a draft implement coupled to a tractor through a lift assembly having at least one link arm and at least one lift rod operated by a hydraulic cylinder, comprising:
  a force transducer coupled to the link arm for providing a total force signal related to the total force applied against the link arm;
  a pressure sensor coupled to the cylinder for providing a pressure signal related to cylinder pressure;
  a position sensor coupled to the lift rod for providing a lift position signal related to the position of the lift rod;
  processing means responsive to both said pressure signal and said lift position signal for providing a component lift force signal related to the component of lift force exerted on the link arm through the lift rod;
  means for adding said component lift force signal to said total force signal to provide a corrected draft force signal proportional to the draft force exerted by the implement;
  combining means for combining a preselected portion of said corrected draft force signal with a preselected portion of said lift position signal to form a feedback signal; and
  a hydraulic valve coupled to said cylinder and responsive to said feedback signal for changing the depth of the implement in response to the feedback signal.

10. The apparatus recited in claim 9 wherein said processing means comprises:
  first means responsive to both said pressure signal and said lift position signal for providing a weight signal related to the weight of the implement; and
  second means responsive to said weight signal and said lift position signal for generating said component lift force signal.

11. The apparatus recited in claim 10 wherein said first means comprises:
  first scale factor means responsive to said lift position signal for providing a first scale factor to convert said pressure signal into said weight signal; and
  first conversion means responsive to both said first scale factor and said pressure signal for converting said pressure signal into said weight signal.

12. The apparatus recited in claim 10 wherein said second means comprises:
  second scale factor means responsive to said lift position signal for providing a second scale factor to convert said weight signal into said component lift force signal; and
  second conversion means responsive to said second scale factor and said weight signal for converting said weight signal into said component lift force signal.

* * * * *

UNITED STATES PATENT AND TRADEMARK OFFICE
CERTIFICATE OF CORRECTION

PATENT NO. : 4,807,136
DATED : February 21, 1989
INVENTOR(S) : Rutkowski et al.

It is certified that error appears in the above-identified patent and that said Letters Patent is hereby corrected as shown below:

On the cover page change the Assignee from "Ford Motor Company, Dearborn, Michigan" to --Ford New Holland, Inc., Troy, Michigan--.

Signed and Sealed this

Twenty-fifth Day of July, 1989

Attest:

DONALD J. QUIGG

Attesting Officer

Commissioner of Patents and Trademarks